United States Patent [19]

Davis, Jr.

[11] 4,077,307

[45] Mar. 7, 1978

[54] MANUFACTURING APPARATUS FOR FABRICATING A DISPOSABLE CRUST ROLLING FORM

[76] Inventor: George B. Davis, Jr., 7512 Marbury Road, Bethesda, Md. 20034

[21] Appl. No.: 725,448

[22] Filed: Sep. 22, 1976

[51] Int. Cl.² .............................................. B31B 41/00
[52] U.S. Cl. .................................. 93/18; 93/DIG. 1; 156/513
[58] Field of Search .................. 93/18, 33 H, DIG. 1; 156/513, 252, 583; 425/302; 53/180, 183, 131

[56] References Cited

U.S. PATENT DOCUMENTS

| | | | |
|---|---|---|---|
| 2,030,118 | 2/1936 | Poppe | 93/18 |
| 2,125,758 | 8/1938 | Waters | 93/18 |
| 3,244,576 | 4/1966 | Swartz | 156/513 |
| 3,350,988 | 11/1967 | Schultz | 156/252 X |
| 3,383,269 | 5/1968 | Kopp | 93/33 H |
| 3,564,807 | 2/1971 | Brieske | 93/33 H |
| 3,748,205 | 7/1973 | Adams | 156/252 |
| 3,869,327 | 3/1975 | Lambert et al. | 156/513 X |
| 3,954,049 | 5/1976 | Brieske | 93/33 H X |

*Primary Examiner*—Francis S. Husar
*Assistant Examiner*—William R. Briggs

[57] ABSTRACT

Manufacturing apparatus for fabricating a disposable crust rolling form wherein crust dough, after being placed within the form, may be rolled therein into the shape of the form and thickness of the finished crust.

14 Claims, 6 Drawing Figures

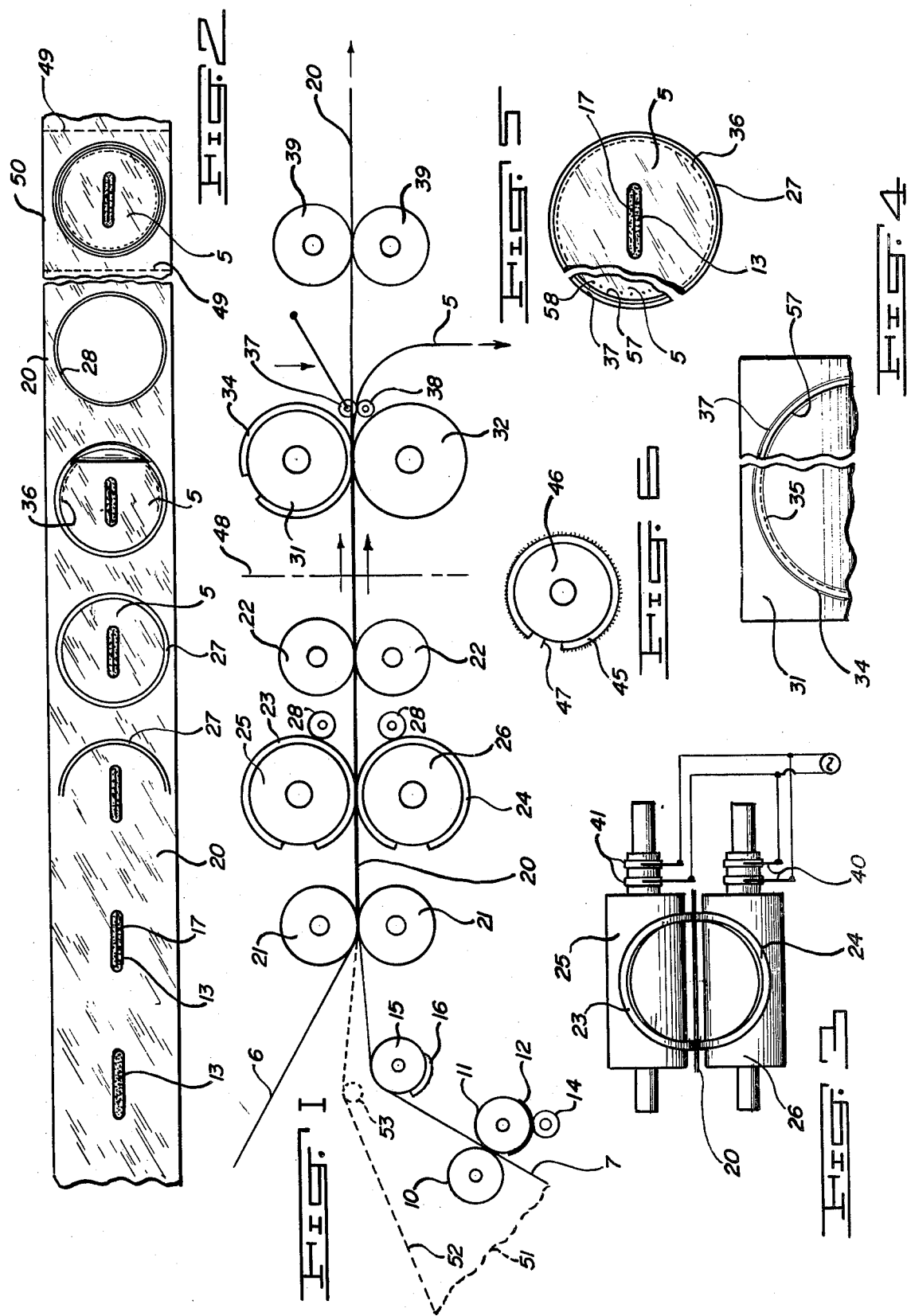

MANUFACTURING APPARATUS FOR FABRICATING A DISPOSABLE CRUST ROLLING FORM

The present invention provided for fast, simple, and inexpensive apparatus for the manufacture of the piecrust rolling form as covered by U.S. Pat. No. 3,819,316, and wherein two thinly formed layers of flexible film material are secured together about their edges to form a circular receptacle into which extends a dough admitting slot and through which prepared dough may be admitted into the form for being rolled therein into crust form and wherein the edge of the form is so weakened or punctured in close inner adjacency to the sealed edge thereof as to permit the edge being torn free to open the form and remove the rolled crust.

It is understood that to perform manufacturing operations upon a moving film strip is old in the art, however, to effect in a manufacturing procedure, a closed circular seal between two thinly formed layers of film to form therein a wafer-like closed receptacle into which extends through only one side thereof an elongated slit and so weaken the receptacle as to provide thereon a tear-off edge, then sheer the receptacle from the strip preferably with the strip in continuous motion, proved a unique problem.

It is an object of the present invention to provide new and improved manufacturing apparatus for the fabrication of a piecrust rolling form of the type disclosed wherein all manufacturing operations required to produce the form from the film strip or strips from which form is fabricated, being preferably conducted upon the strips with the strips maintained in continuous motion.

To more fully understand the merits and advantages of the manufacturing apparatus herein disclosed, reference is now directed to the description and accompanying drawings wherein:

FIG. 1 shows in schematic, the apparatus of manufacture required to produce a piecrust rolling form of the type disclosed from continuously moving flexible film.

FIG. 2 is a plan view of a section of the strips upon which has been performed the steps of manufacture required to produce the device of FIG. 5.

FIG. 3 is a view in elevation of the heat-sealing rollers and including the sealing rings as they relate to each other and the plastic strips being sealed therebetween.

FIG. 4 is a fragmentary view in elevation, as looking at a section of the shearing, puncturing or weakening die as used in one of the manufacturing steps of the apparatus of FIG. 1.

FIG. 5 is a plan view in elevation of a finished piecrust rolling form as produced by one complete cycle of operation of the apparatus of FIG. 1.

FIG. 6 is an end view of an alternate form of puncturing die and roller and including a puncturing blade for producing a product for dispensing in rolled tear-off form.

Referring now to the drawings and particularly to FIG. 5 thereof wherein is shown a finished piecrust rolling form as produced by the apparatus of FIG. 1.

As apparent from FIG. 1, the rolling form of FIG. 5 is produced from two thinly formed sheets 6 and 7 of flexible material such as a heat-sealable plastic film of which at least one sheet preferably is transparent. These strips are supplied to the forming apparatus as from conventional supply reels, not shown. The arrangement provides that prior to convergence of the strips between roller pairs 21, strip 7 is caused to pass between a backup roller 10 and printing roller 11 upon which is provided a printing surface 12 that operates to apply an elongated identifying mark 13 upon the strip as shown to advantage in FIG. 2. Ink may be supplied to the printing surface 12 as by roller 14.

Following the printing of strip 7, the strip is caused to pass over roller 15 from which extends a blade 16 that operates to incise an elongated slit 17 through the strip and substantially through the center of identifying mark 13 and as also shown to advantage in FIG. 2. It is through this slit 17 that the dough to be rolled is subsequently inserted into the receptacle for being rolled therein into piecrust form. The purpose of the identifying or locating mark 13 is to enable the user to more quickly and easily find the slit that could otherwise be quite difficult because of the preferably transparent nature of the film from which the form is fabricated.

Following the printing and slitting operations, the strips 6 and 7 are caused by rollers 21, to converge into what will now be referred to as strip 20. Rollers 21 are mounted for independent rotation, however, each of these rollers 21 include suitable drag-clutch means whereby the strips 6 and 7 are maintained taut, and evenly and tightly together as they are drawn between the heated sealing rings 23 and 24 as mounted upon rollers 25 and 26 respectively, and as drawn therebetween by driven draw rollers 22. Current for electrically heating the rollers 25 and 26 and sealing rings thereon, is supplied by way of contact members 40 and slip rings 41. While herein is shown one sealing ring as mounted upon each roller, it is understood that more than one such sealing ring and of differing sizes may be arranged about each roller.

While herein is shown both rollers 25 and 26 as being electrically heated, it is understood that only one roller such as 21 need be heated with the ring 24 on roller 26 serving only as a backup surface for producing the seal upon the strip. It has been found however, that by heating both sealing surfaces, the heat recovery time of these sealing members becomes more stable and the sealing time is reduced by approximately one half. This, in effect, means that twice the number of forms may be produced during the same operating interval of the apparatus. As apparent from FIG. 3 the strip 20 is maintained between the sealing surfaces 23 and 24 only and never allowed to contact or touch the heated surface of the rollers 24 and 25 which could cause sticking or marring of the surfaces of the strip.

From the draw rollers 22, the strip 20 is caused to pass beneath the puncturing and shearing ring 34, FIG. 1 as mounted upon roller 31 and which, with backup roller 32, effects a circular series of closely spaced punctures 36 through one or both sheets of the strip 20 to provide therein a weakened tear-off side or edge that enables the user, following the rolling operation, to open the form and remove the rolled crust.

Preferably, the sealing rings 23 and 24 effects a wide, say ½ inch, circular seal as at strip 20 when securing the strip halves together, thereby as the shear ring 34 subsequently operates to cut or partially cut the rolling form from the strip, a portion of the ring seal as at 28 is left upon the strip to assist in maintaining the strip sections together and more easily handled as the waste is drawn from the apparatus to pass to suitable takeup reels, not shown. The waste may be then shredded and recycled for another pass through the forming apparatus.

Following the shearing operation whereupon the form is cut or substantially cut from the strip, a spring based roller 37 as bearing upon driven roller 38, operates to press the cut or partially cut form 5 from the strip as shown.

While in FIGS. 1 and 4 the puncturing and shearing rings are shown as mounted commonly upon roller 31 and whereby their functions are effected upon the strip concurrently, it is understood that if desired the puncturing or weakening die such as may be mounted upon a separate roller such as shown in FIG. 6 and position as at 48 ahead of the shear ring 34. The advantage of such a structure enables the dies to be more readily sharpened or maintained.

Should it be desired that the strip be marketed as a tear-off item from a rolled strip, there could be provided upon roller 46 a puncturing blade such as 47 to effect a weakened line across the strip as at 49 thusly to permit the strip section 50 to be torn free of the strip for thereafter removing the partially cut form 5 from the strip section prior to using. In such an instance pushout rollers 37 and 38 would not be used in fabricating this form of the device.

Driven draw rollers 39 include independent slipping clutch means of any suitable type and set to slip at some value less than would operate to forcefully drag the strip 20 from between the driven draw rollers 22 to throw the movement of the strip passing through the apparatus out of proper synchronization.

Any suitable form of adjustment and synchronizing means may be employed throughout the device to synchronize the movement of driven draw rollers 22 with respect to the printing, slitting, sealing, puncturing, and shearing apparatus.

Further, it has been found desirable in order to prevent relative shifting of the high-slick surfaces of strip 20 with respect to each other as they are drawn by driven draw rollers 22 between the sealing rings 23 and 24, that rollers 22 could include along their outer circumferential edge, slightly protruding puncturing pins that will operate to penetrate and puncture the outer edge of the plastic layers forming strip 20, sufficiently as to prevent any shifting of the strips with respect to each other as they are fabricated into the finished form.

Additionally, when sealing certain types of plastic film that has a tendency to adhere or stick to sealing surfaces, a thin layer of release lubricant such as silicon may be applied to rings 23 and 24 as by rollers 28 respectively. A further non-stick precaution is to suitably coat the sealer surfaces of rings 23 and 24 with a non-stick material such as Teflon or the like.

If so desired, a layer of material comprised of half of a single strip such as 51 may be caused to pass through the printing and slitting portions of the apparatus before the other half 52 of the strip is caused, by the arm 53, to be folded over the slitted portion of the strip to become the second layer of the material of the form and whereafter the sealing together of these layers operate to form the crust rolling receptacle defined. While this arrangement of folding over the material of a single strip of material to fabricate the rolling form has been found operable, the difficulty of maintaining the strip halves taut and without wrinkles as they pass beneath or between the sealing rollers, makes the two strip arrangements as previously described, highly advantageous.

Further, while herein is shown the inner edge of the form adjacent the seal as being weakened by a plurality of punctures 35, it has been found that the plastic of the form may be partially cut through and thusly weakened for tear-off as at 56, FIG. 5, and as accomplished by ring 57 shown upon the die 31, FIG. 4. However, if this arrangement is used, punctures such as 58 should be extended into the receptacle in spaced relation about its surface to vent the air from the receptacle as dough is rolled therein into piecrust shape. Preferably, the weakening of the surface by the ring 57 should be conducted upon a single layer of the strip at a time to more closely regulate and control the depth of the weakening groove. Further, while it is understood that the shear ring 37 may completely sever the receptacle from the strip 20, there will be found certain advantages in the ring 37 operating to partially cut the receptacle from the strip thusly to maintain the form with the strip for more easily handling prior to the push-out rollers 37 and 38 operating to forcefully extract the partially cut form from the strip.

While herein is shown an arrangement of manufacturing apparatus that has been found satisfactory, it is understood that the arrangement and positioning of certain of the components of the apparatus may be altered and certain of the sequence of operations be varied without departing from the manufacturing concept as herein disclosed.

What I therefore claim and desire to cover by letters patent is:

1. Apparatus for the manufacture of a piecrust rolling form of the character described including first feeding means feeding a first layer of thinly formed flexible material in a given direction, incising means downstream from said feeding means operable to incise an elongated slit in said first layer, applying means downstream from said feeding means operable to apply an identifying means to said layer in an area enclosing said slit, second feed means downstream from said applying means operable to juxtapose a second layer of thinly formed material against said incised layer of flexible material, sealing means downstream from said second feed means operable to secure together the said layers of material to form therebetween an enclosed wafer-like receptacle into which extends said elongated slit with the configuration of the secured together surfaces of the material defining the edge and outer configuration of the receptacle, separating means downstream from said securing means operable to separate said receptacle from said layers of material, weakening means operable to weaken a portion of the material of the receptacle in close inner adjacency to said edge, forming means operable to extend into the material forming said receptacle a plurality of air passing ports said weakening means and said forming means being positioned intermediate said sealing means and said separating means.

2. Manufacturing apparatus as claimed in claim 1 wherein said means operable to secure said layers of material together effects between said layers of material a receptacle of substantially circular configuration.

3. Manufacturing apparatus as claimed in claim 1 wherein said means operable to secure the said layers of material together is in the form of a heated surface extending from the surface of a rotatable drum and contoured to the outer configuration of the secured together periphery of said receptacle.

4. Manufacturing apparatus as claimed in claim 1 wherein said means operable to secure said layers of material together is in the form of two heated surfaces extending respectively from two rotatable drums and synchronously driven with respect to each other as to effect a heat seal between the surfaces of the material defining the outer configuration of said receptacle.

5. Manufacturing apparatus as claimed in claim 1 wherein said forming means forms through the material of said receptacle said plurality of closely spaced air passing in close inner adjacency to said secured-together edge of the receptacle.

6. Manufacturing apparatus as claimed in claim 1 wherein the said means operable to separate the said receptacle from the material from which the receptacle is formed, operates to cut through at least a portion of said secured-together edge of the receptacle.

7. Manufacturing apparatus as claimed in claim 6 wherein said means operable to separate the said receptacle from the material from which the receptacle is formed includes means operable to partially cutting the receptacle from the material and including further means operable to forcefully separating the partially cut receptacle completely from the material.

8. Manufacturing apparatus for the manufacture of a pie crust rolling form of the character described including, feeder means operable to supply a strip of thinly-formed flexible material in a given direction to said forming apparatus, incising means downstream from said feeding means operable to incise in said strip an elongated slit, applying means downstream from said feeding means operable to apply an identifying means to said strip in an area enclosing said slit, folding means downstream from said incising means operable to fold a portion of said strip over said slit, sealing means downstream from said folding means operable to secure together the surfaces of said strip to form therebetween a wafer-like receptacle into which extends said elongated slit, separating means downstream from said sealing means operable to separate said receptacle from the material of said strip and means between said sealing means and said separating means operable to extend through the material of said receptacle in close inner adjacency to it's edge a plurality of closely spaced air passing ports.

9. Manufacturing apparatus as claimed in claim 8 wherein said means operable to secure together the folded together surfaces of said strip effects therebetween a substantially circular seal defining the circular outer periphery of the receptacle.

10. Manufacturing apparatus as claimed in claim 8 wherein said means operable to secure together the folded together surfaces of said strip is in the form of a heated surface extending from the surface of a rotatable drum and contoured to the configuration of said receptacle.

11. Manufacturing apparatus as claimed in claim 8 wherein said means operable to secure together the folded together surfaces of said strip is in the form of two heated surfaces extending respectively from two synchronously driven rotatable drums with said heated surface coating to effect between the folded together surfaces of said strip a heat seal defining the outer configuration of said receptacle.

12. Manufacturing apparatus as claimed in claim 8 which further includes means operable to weaken a portion of the material of said receptacle in close inner adjacency to said secured-together surface defining the configuration of the receptacle.

13. Manufacturing apparatus as claimed in claim 8 wherein the said means operable to separate the said receptacle from said strip operates to cut through at least a portion of the sealed-together edge of said receptacle.

14. Manufacturing apparatus as claimed in claim 8 wherein said means operable to separate said receptacle from the material of said strip operates to first effect a partial cut through the sealed-together surface of said receptacle and thereafter to forcefully separate the receptacle from said strip.

* * * * *